Sept. 23, 1930.                    G. M. CLASS                    1,776,415

EXPANDING RING FRICTION DEVICE

Filed July 31, 1929

Inventor
George M. Class,

Patented Sept. 23, 1930

1,776,415

UNITED STATES PATENT OFFICE

GEORGE M. CLASS, OF MADISON, WISCONSIN, ASSIGNOR TO GISHOLT MACHINE COMPANY, OF MADISON, WISCONSIN, A CORPORATION OF WISCONSIN

EXPANDING-RING FRICTION DEVICE

Application filed July 31, 1929. Serial No. 382,345.

This invention relates to friction devices of the expanding ring type, wherein a split ring mounted between two concentric members and locked to one of them is expanded into gripping contact with the other through the agency of a radially disposed expander having a wedge-shaped head that is forced between the ends of the split ring. Friction devices of this general type are sometimes employed as a clutch to transmit rotary motion from one of the concentric members to the other, and also used as a brake where one of the concentric members is stationary and the other is rotatable, to arrest the rotation of the rotatable member.

In friction devices of this type it is common to actuate the expander by means of a sliding cam located within the inner of the two concentric members. After a greater or less period of use through the effects of wear, the efficiency of the device is impaired, due mainly to the fact that the working movement of the expander is insufficient to effect full cooperation of the split ring with the part with which it cooperates; and the main object of the present invention is to provide in a friction device of this character, an improved expander which will automatically take up wear, and thus continue to function effectively, on the principle of automatically lengthening the expander to compensate for wear.

The invention, its mode of operation and functional utility will all be apparent to persons skilled in the art as the same becomes better understood by reference to the following detailed description, taken in connection with the accompanying drawing, wherein I have illustrated a simple and practical embodiment of the invention and in which—

Fig. 3 also shows the expander cap and spring assembled with the expander head.

Figure 1:
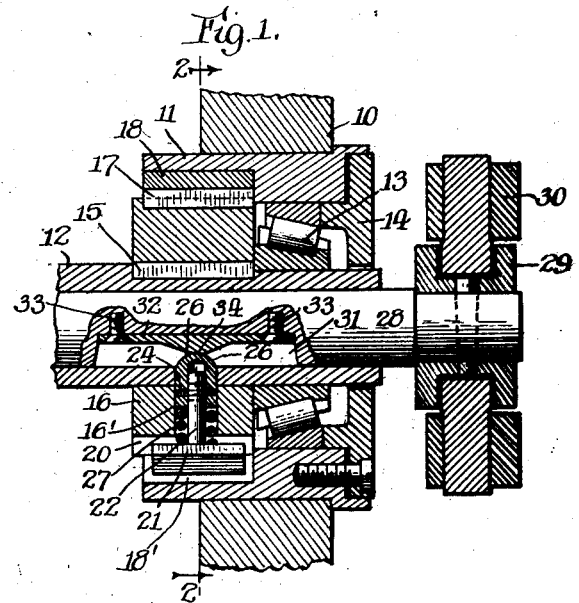
Fig. 1 is a longitudinal section through the friction device.
Figure 2:
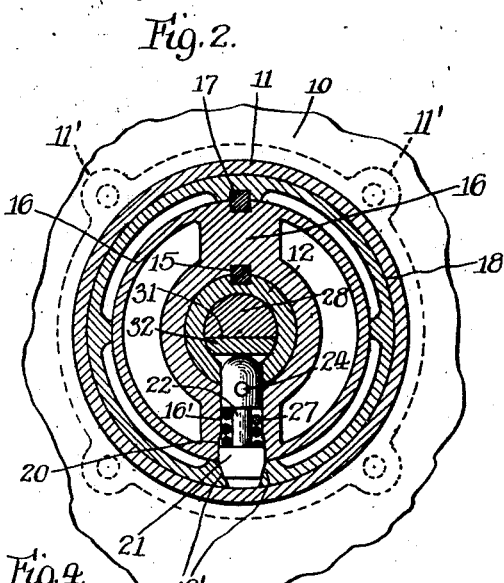
Fig. 2 is a transverse section taken on the line 2—2 of Fig. 1.

In the drawing, I have illustrated a form of the device adapted to function as a brake for a hollow rotary shaft, such as, for instance, the spindle of a lathe; but it will be understood that the invention is equally serviceable as a clutch for connecting and disconnecting two co-axial rotary members, so as to impart a drive from one to the other. Referring to the drawings, 10 may designate a stationary member which may be a machine frame or housing part or the like, having an opening in which is fitted an annular stationary drum 11, the latter having on one end apertured ears 11' (Fig. 2) by which, through machine screws it is attached to the stationary frame piece 10. 12 designates a tubular shaft which is disposed within and concentric with the drum member 11, and is supported for free rotation by an ordinary antifriction bearing designated as an entirety by 13, the outer end of the bearing being closed by a cap 14 that is centrally apertured to accommodate one end of the tubular shaft 12.

Secured on the shaft 12, as by a key 15, is an inner brake shoe support or carrying member 16, in this instance, in the form of a drum concentric with the outer drum 11. Located between the co-axial drums 11 and 16, and attached to the latter by a key 17 is the split ring 18, functioning, in the instance shown, as a brake shoe. The two spaced ends of the split ring 18 are beveled or tapered as shown at 18' in Fig. 2, as is usual in expanding ring friction devices of this type, to receive the head of the expander.

Figure 3:
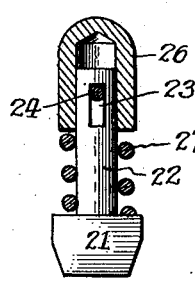
Figs. 3 and 4 are end and side detail views of the expander head and stem.
Figure 4:
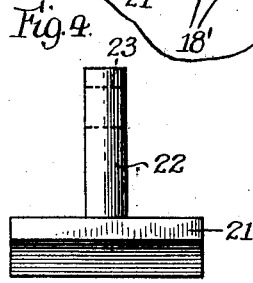
Figure 5:
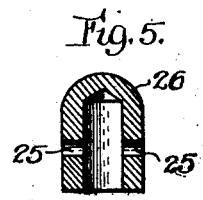
Fig. 5 is a longitudinal section of the expander cap.

The inner rotary drum or hub 16 is formed with a radial bore or other suitable opening 16' that, at its outer end, opens into a transverse groove 20, which groove is of a size to slidably fit the head 21 of the expander. The sides of the expander head are tapered, as clearly shown in Figs. 2 and 3, to effect a wedging action on the correspondingly tapered ends 18' of the split ring or shoe 18. 22 designates the stem or shank of the expander, which lies within the radial bore 16' but is of considerably less diameter than the latter. The inner end of the stem 22 is formed with a transverse slot 23, through which passes a pin 24, the ends of which are fitted into holes 25 in a cap piece 26 that fits the stem 22 of the expander. Encircling the stem 22 and confined between the head 21 and the cap 26 is a coil spring 27 that normally urges the expander head and cap apart, the cap 26 having a limited play on the stem 22 by reason of the pin and slot connection above described.

Extending through the tubular shaft 12 is an operating rod 28 equipped on its outer end with a peripherally grooved disk 29 engaged by the usual clutch-shifting fork 30, through which endwise movement may be imparted to the rod 28 simultaneously with the rotation of the latter, it being understood that the rod 28 is splined to the tubular shaft 12 so as to partake of the rotation of the latter. In a cut-away portion 31 of the rod is located a hardened steel plate 32 secured to the rod by screws 33, and formed with a cam 34 which engages the cap 26 of the expander, and forces the latter outwardly when the rod 28 is actuated. The outward movement of the cap, under the thrust of the cam, is transmitted to the expander head 21 through the spring 27, thus expanding the ring 18, and, in the construction shown, locking the rotary shaft 12 to the stationary drum 11, thus arresting the rotation of the shaft.

The strength of the spring 27 is preferably such that when the expander 21 has been forced between the inclined faces 18' a distance sufficient to expand the brake shoe enough to stop rotation of the shaft, the spring will yield under further movement of the cam 34. It will, of course, be further understood that the throw of the cam is greater than is necessary to move the expander into operative position when the parts are comparatively new and unworn. However, as wear occurs between the expander head and the faces 18', between the cam and cap, it becomes necessary to cause increased movement of the expander to effectively expand the brake shoe 18. Such increased adjustment is obviously obtained by the described yielding expander structure in that the spring 27 serves to maintain the expander at its maximum length while permitting the same to be shortened to meet operating requirements. This structure obviates the use of excessive expanding force which would serve no useful purpose but would tend to cause excessive wear between the various parts. When the actuating cam is in inoperative position, the expander unit assumes its maximum length under the influence of the spring and, in effect, floats in the bore 16' without exerting any appreciable expanding effect on the brake shoe. Longevity of the device as a whole is thereby increased, and it is unnecessary to frequently renew the cam or the expander or both.

The structural details herein shown and described may manifestly be more or less varied by persons skilled in the art without departing from the principle of the invention or sacrificing any of its advantages; and hence I reserve all such variations, modifications and mechanical equivalents as fall within the spirit and purview of the appended claims.

I claim as my invention:

1. In a friction device of the type described, the combination of a hollow shaft, a hub member fast on said shaft, an expansible shoe attached to said hub member, a drum located concentric with said hub adapted to be engaged by said shoe, means for expanding said shoe into contact with said drum comprising a plunger of adjustable but fixed maximum length, and a cam within said hollow shaft for actuating said plunger, said cam having a throw, the extent of which is greater than necessary to expand said shoe into gripping contact, and a spring normally maintaining said plunger extended to said maximum length but allowing the same to be shortened to take up the excess throw of said cam.

2. In a friction device of the type described, the combination of a hollow shaft, a ring-supporting hub fast on said shaft, said shaft and hub being formed with an opening extending transversely of the axis of said shaft and hub, a drum encircling said hub, a split ring between said hub and drum attached to said hub, an expander comprising a wedge-shaped head lying between the ends of said ring, said head being mounted on said hub so as to be adjustable transversely of the axis of said shaft and ring, a cap slidably fitting said opening, a spring in said opening between said cap and head, and a cam in said hollow shaft for actuating said head through the agency of said cap and spring.

3. In a friction device of the type described, the combination of a hollow shaft, a hub member fast on said shaft, said shaft and hub member formed with an opening extending transversely of the axis of said shaft and hub, a drum encircling said hub member, a split ring between said hub and said drum attached to the former, an expander including a wedge-shaped head lying between the ends of said ring, a cam in said hollow shaft for actuating said expander, and yielding means between said head and cam for transmitting the throw of the cam to said expander head.

4. In a friction device of the type described, the combination of a hollow shaft, a hub member fast on said shaft, said shaft and hub member being formed with a radial bore, a drum encircling said hub member, a split ring between said hub member and drum attached to the former, an expander comprising a wedge-shaped head lying between the ends of said ring, a stem lying in said bore with one end engaging said head, a cap slidable on said expander stem, and a spring between said cap and head; and a cam in said hollow shaft for actuating said expander through the agency of said cap and spring.

5. In a friction device of the type described, the combination of a hollow shaft, a hub member fast on said shaft, said shaft and hub member being provided with a radial bore, an outer drum encircling and co-axial with said hub and shaft, a split ring between said hub and drum attached to said hub, an expander comprising a wedge-shaped head lying between the ends of said ring, a stem lying in said bore with one end engaging said head, a cap slidable on said stem and slidably fitting in said bore, a pin and slot connection between said cap and stem permitting a limited movement of said cap lengthwise of said stem, and a spring encircling said stem between said cap and head for normally maintaining said cap in its outermost position of adjustment on the stem, and a cam in said hollow shaft for actuating said expander through the agency of said cap and spring.

6. In a friction device of the type described, the combination of a hollow rotatable shaft, a hub fast on said shaft, said shaft and hub being provided with a radial bore, an outer drum encircling and co-axial with said hub and shaft, a split ring between said hub and drum attached to said hub, an expander comprising a wedge-shaped head lying between the ends of said ring, a transversely slotted stem lying in said bore, a cap slidable on said stem and slidably fitting said bore, a pin in said cap extending through the slot of said stem, and a spring encircling said stem between said cap and head, and a cam in said hollow shaft for actuating said expander through the agency of said cap and spring.

GEORGE M. CLASS.